United States Patent
Nishioka et al.

(10) Patent No.: US 9,832,846 B2
(45) Date of Patent: Nov. 28, 2017

(54) ELECTRICAL APPARATUS MANAGEMENT SYSTEM

(71) Applicant: Panasonic Intellectual Property Management Co., Ltd., Osaka (JP)

(72) Inventors: Shinsuke Nishioka, Osaka (JP); Hiroshi Sugawara, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/428,180

(22) Filed: Feb. 9, 2017

(65) Prior Publication Data
US 2017/0231068 A1    Aug. 10, 2017

(30) Foreign Application Priority Data

Feb. 10, 2016 (JP) .................................. 2016-023622

(51) Int. Cl.
*H02J 13/00* (2006.01)
*H05B 37/02* (2006.01)

(52) U.S. Cl.
CPC ..... *H05B 37/0272* (2013.01); *H05B 37/0245* (2013.01)

(58) Field of Classification Search
CPC ........................ H05B 37/0245; H05B 37/0272
USPC ......................................................... 340/9.1
See application file for complete search history.

(56) References Cited

U.S. PATENT DOCUMENTS

| 9,208,680 | B2* | 12/2015 | Norlen .................... G08C 19/16 |
| 9,301,090 | B2* | 3/2016 | Kusakari .......... H04B 10/25758 |
| 9,447,960 | B2* | 9/2016 | Kusakari ................. F21V 33/00 |
| 2006/0028212 | A1 | 2/2006 | Steiner et al. |
| 2014/0062334 | A1 | 3/2014 | Nagazoe et al. |

(Continued)

FOREIGN PATENT DOCUMENTS

| JP | 2008-509478 A | 3/2008 |
| JP | 2009-266654 A | 11/2009 |

(Continued)

*Primary Examiner* — Thuy Vinh Tran
(74) *Attorney, Agent, or Firm* — McDermott Will & Emery LLP (57) ABSTRACT

An electrical apparatus management system includes electrical apparatuses installed in a building, a management device that communicates with each of the electrical apparatuses, and an operation terminal that communicates with each of the electrical apparatuses. The operation terminal transmits management address information individually to each of the electrical apparatuses using radio having directivity, the management address information being information to be assigned individually to each of the electrical apparatuses. Each of the electrical apparatuses has an own specific address, stores the management address information transmitted from the operation terminal, and transmits the specific address and the management address information. The management device establishes a correspondence between the specific address and the management address information that have been transmitted, stores the specific address and the management address information, and controls operations of the electrical apparatuses based on the specific address and the management address information that have been stored.

11 Claims, 11 Drawing Sheets

(56) References Cited

U.S. PATENT DOCUMENTS

| | | |
|---|---|---|
| 2014/0070706 A1 | 3/2014 | Fushimi |
| 2014/0070707 A1 | 3/2014 | Nagazoe |
| 2014/0236327 A1 | 8/2014 | Sasaki et al. |
| 2016/0004231 A1* | 1/2016 | Yoshimura ............. G08C 17/02 700/17 |
| 2016/0204859 A1* | 7/2016 | Schenk ............. H05B 37/0245 398/118 |

FOREIGN PATENT DOCUMENTS

| | | |
|---|---|---|
| JP | 2014-044915 A | 3/2014 |
| JP | 2014-044916 A | 3/2014 |
| JP | 2014-056670 A | 3/2014 |
| JP | 2014-056723 A | 3/2014 |
| JP | 2014-160680 A | 9/2014 |
| JP | 2015-018636 A | 1/2015 |

* cited by examiner

| OPERATION SWITCH | MANAGEMENT ADDRESS | GROUP | SPECIFIC ADDRESS OF LIGHTING APPARATUS |
|---|---|---|---|
| ENTRANCE-SIDE SWITCH | 01 | A | aaaa |
| | 02 | A | bbbb |
| WINDOW-SIDE SWITCH | 03 | B | cccc |
| | 04 | B | dddd |

ELECTRICAL APPARATUS MANAGEMENT SYSTEM

CROSS REFERENCE TO RELATED APPLICATION

This application claims the benefit of priority of Japanese Patent Application Number 2016-023622 filed on Feb. 10, 2016, the entire content of which is hereby incorporated by reference.

BACKGROUND

1. Technical Field

The present disclosure relates to an electrical apparatus management system for managing a plurality of electrical apparatuses.

2. Description of the Related Art

Conventionally, a lighting apparatus management system for managing a plurality of lighting apparatuses has been known as an example of an electrical apparatus management system (see Japanese Unexamined Patent Application Publication No. 2014-56723). In this lighting apparatus management system, each of the plurality of lighting apparatuses is assigned an address for individually managing and controlling the plurality of lighting apparatuses.

Each lighting apparatus is usually assigned a specific address at the time of factory shipment. However, when each lighting apparatus is installed in a building material such as a ceiling, a correspondence between the lighting apparatus and the specific address, namely, which lighting apparatus has which specific address, is unknown in many cases.

Thus, after each lighting apparatus is installed in the building, a contractor establishes a correspondence between the specific address that the lighting apparatus has and a location of the lighting apparatus on the coordinates. For example, the contractor uses a tablet terminal to select a predetermined address displayed on a screen, send a radio signal to a lighting apparatus corresponding to the selected address, and cause the lighting apparatus to lighten and darken (blink), thereby finding out the correspondence between the selected address and the lighting apparatus.

However, when a large number (for example, greater than or equal to 100) of the lighting apparatuses are installed in the building, since some of them are located far away, the contractor finds it difficult to immediately grasp at which coordinates (position) in the building the lighting apparatus corresponding to the selected address is located. In some cases, in order to make sure which lighting apparatus is lightening and darkening, the contractor needs to go back and forth between an end of the building to the other many times, which involves considerable efforts.

This problem occurs not only in the lighting apparatus but also other electrical apparatuses such as a display apparatus and an audio apparatus.

SUMMARY

With the foregoing in mind, the present disclosure provides an electrical apparatus management system that can grasp addresses of a plurality of electrical apparatuses and easily manage the addresses of the plurality of electrical apparatuses.

One aspect of an electrical apparatus management system according to the present disclosure includes a plurality of electrical apparatuses installed in a building, a management device that communicates with each of the plurality of electrical apparatuses, and an operation terminal that communicates with each of the plurality of electrical apparatuses. The operation terminal transmits management address information individually to each of the plurality of electrical apparatuses using radio having directivity, the management address information being information to be assigned individually to each of the plurality of electrical apparatuses. Each of the plurality of electrical apparatuses has an own specific address, stores the management address information that has been transmitted from the operation terminal, and transmits the specific address and the management address information. The management device establishes a correspondence between the specific address and the management address information that have been transmitted, stores the specific address and the management address information, and controls operations of the plurality of electrical apparatuses based on the specific address and the management address information that have been stored.

It is possible to manage addresses of a plurality of electrical apparatuses easily.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

In the following, an electrical apparatus management system according to embodiments will be described, with reference to the accompanying drawings. It should be noted that all of the embodiments described below illustrate one specific example of the present disclosure. Thus, the numerical values, shapes, materials, structural components, the arrangement and connection of the structural components mentioned in the following embodiments are merely an example and not intended to limit the present disclosure. Accordingly, among the structural components in the following embodiments, the one that is not recited in any independent claim exhibiting the most generic concept of the present disclosure will be described as an arbitrary structural component.

Incidentally, each of the figures is a schematic view and not necessarily illustrated in a strict manner. Furthermore, in each of the figures, substantially the same structures are assigned the same reference signs, and the redundant description of such structures will be omitted or simplified.

Embodiment 1

Configuration of Electrical Apparatus Management System

Figure 1:
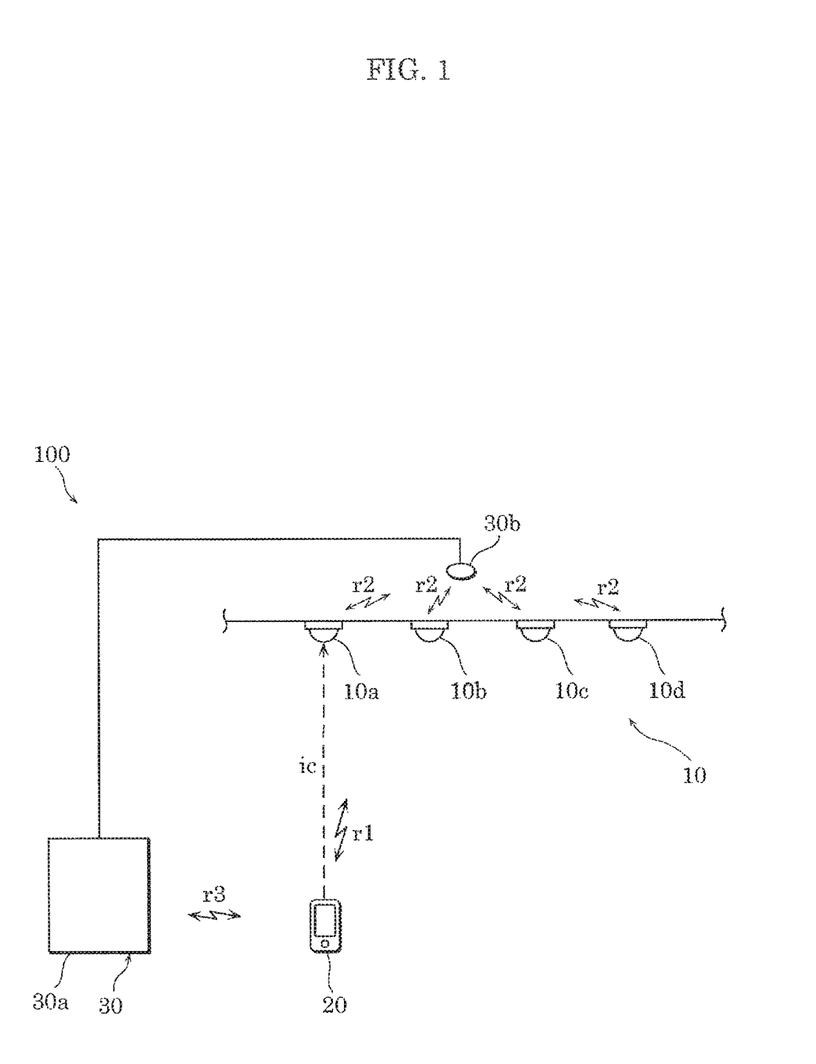
FIG. 1 schematically illustrates an electrical apparatus management system according to Embodiment 1 including lighting apparatuses, an operation terminal, and a management device.

FIG. 1 illustrates electrical apparatus management system 100 according to Embodiment 1. Electrical apparatus management system 100 includes a plurality of electrical apparatuses 10, operation terminal 20, and management device 30.

Examples of electrical apparatus 10 can include a lighting apparatus, a display apparatus (a monitor), an audio apparatus (a speaker) and the like. In the present embodiment, as an example of the plurality of electrical apparatuses 10, a plurality of lighting apparatuses 10a, 10b, 10c, and 10d will be described.

Although FIG. 1 illustrates four lighting apparatuses 10a to 10d as an example, greater than or equal to 100 lighting apparatuses are sometimes installed in a ceiling of an actual building. Thus, it has conventionally been difficult to establish correspondences between locations of the lighting apparatuses in the building and addresses of the lighting apparatuses, so that considerable efforts are needed for address setting for managing the lighting apparatuses. Electrical apparatus management system 100 according to the present embodiment has a configuration described below, thus making it easier to manage an enormous number of the lighting apparatuses.

First, referring to FIG. 1, the following description will be directed to communication systems of the plurality of lighting apparatuses 10a to 10d, operation terminal 20, and management device 30 that are included in electrical apparatus management system 100.

Each of the plurality of lighting apparatuses 10a to 10d and management device 30 can communicate with each other by radio r2. The communication system by radio r2 can be, for example, a specified low power radio utilizing frequencies in a 920 MHz band or a 2.4 GHz band, Zigbee (registered trademark), Bluetooth (registered trademark), or WiFi (registered trademark). Incidentally, a mesh network may be formed between lighting apparatuses 10a to 10d within a radio communication range, and radio communication may be established via this mesh network. Furthermore, lighting apparatuses 10a to 10d and management device 30 may form a wired network so as to be able to communicate with each other.

Each of the plurality of lighting apparatuses 10a to 10d and operation terminal 20 can communicate with each other by infrared communication ic. More specifically, operation terminal 20 transmits a signal to lighting apparatuses 10a to 10d using infrared communication ic, which is an example of radio communication having a directivity. Lighting apparatuses 10a to 10d are installed in the ceiling away from one another by, for example, about 5 m so as to be able to receive an infrared signal from operation terminal 20 individually. As illustrated in FIG. 1, by locating operation terminal 20 near lighting apparatus 10a and sending a signal to lighting apparatus 10a via infrared communication ic, it is possible to convey information only to targeted lighting apparatus 10a. It should be noted that, in the present embodiment, not only infrared communication ic but also radio capable of establishing a one-to-one correspondence, for example, laser light or near field communication (NFC) may be used to transmit signals individually to lighting apparatuses 10a to 10d.

Furthermore, other than transmitting the signals individually to lighting apparatuses 10a to 10d via infrared communication ic, operation terminal 20 is configured to be able to communicate with the plurality of lighting apparatus 10a to 10d via radio r1. The communication system using radio r1 can be similar to that using radio r2.

Moreover, operation terminal 20 and management device 30 can communicate with each other via radio r3. The communication system using radio r3 can be similar to that using radio r2. It should be noted that operation terminal 20 and management device 30 can also communicate with each other by wire using a connection terminal such as a universal serial bus (USB).

The following is a description of each of lighting apparatuses 10a to 10d, operation terminal 20, and management device 30 that are included in a lighting apparatus management system serving as an example of electrical apparatus management system 100.

Operation Terminal

Figure 2:
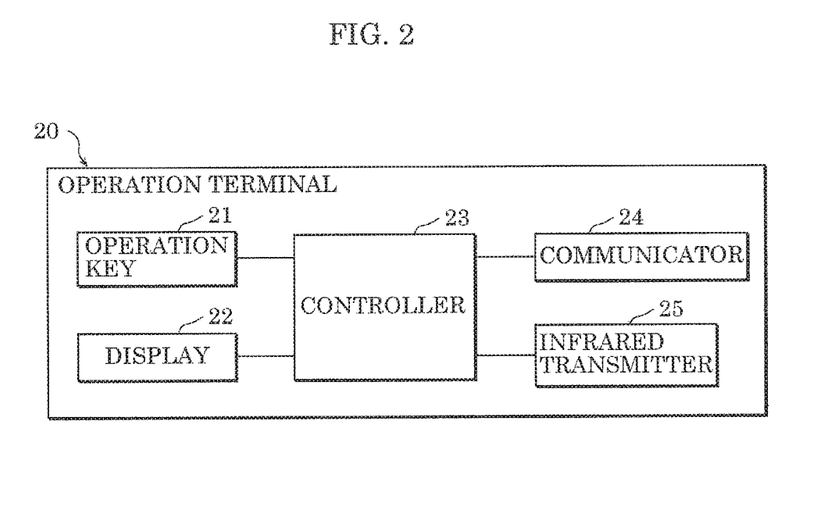
FIG. 2 is a block diagram illustrating a control configuration of the operation terminal.
Figure 5:
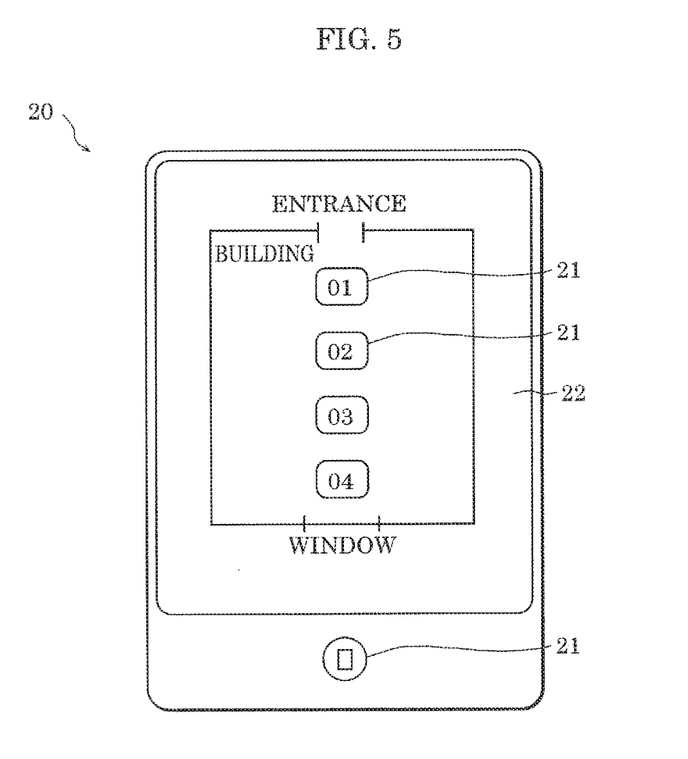
FIG. 5 illustrates an example of a display and operation keys of the operation terminal.
Figure 6:
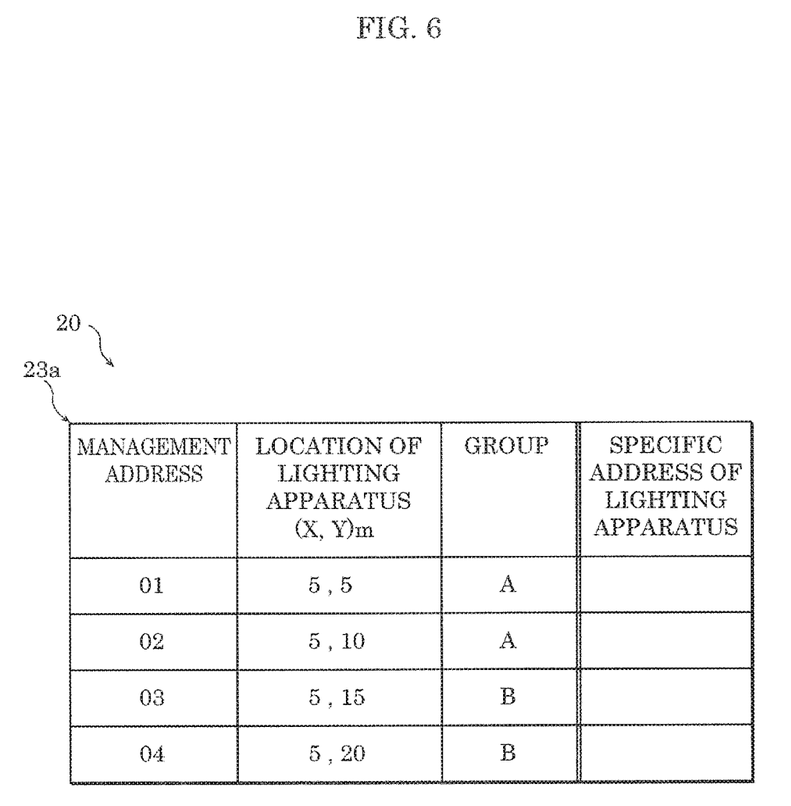
FIG. 6 illustrates an address management table stored in a controller of the operation terminal in which no specific address of the lighting apparatuses is written.

FIG. 2 is a block diagram illustrating a control configuration of operation terminal 20. FIG. 5 illustrates an example of display 22 and operation keys 21 of operation terminal 20. FIG. 6 illustrates management table 23a of addresses stored in controller 23 of operation terminal 20.

Operation terminal 20 is, for example, a tablet terminal or a smartphone. Operation terminal 20 in the present embodiment is used as a setting tool for setting addresses necessary for address management. As illustrated in FIG. 2, operation terminal 20 includes controller 23, infrared transmitter 25, display 22, operation key 21, and communicator 24.

Controller 23 is configured by a central processing unit (CPU), a random access memory (RAM), a read only memory (ROM), and so on, and controls display 22, operation key 21, infrared transmitter 25, and communicator 24. Controller 23 reads out information and writes information when setting the addresses.

At the time of completion of the address setting, management address information for managing lighting apparatuses 10a to 10d and specific addresses that respective lighting apparatuses 10a to 10d originally have, etc. are stored in controller 23.

As illustrated in management table 23a of FIG. 6, the management address information includes information such as management addresses (numerals or alphabets), locations and groups of lighting apparatuses 10a to 10d. Management addresses 01 to 04 in the management address information are addresses for management that are set by a user to identify lighting apparatuses 10a and 10d. The locations of lighting apparatuses 10a to 10d indicate respective locations (X and Y coordinates) of lighting apparatuses 10a to 10d when the building is viewed from above. The groups are operation groups indicating where each of lighting apparatuses 10a to 10d belongs to and serving to dim or tone lighting apparatuses 10a to 10d by each group.

Incidentally, at the stage immediately after lighting apparatuses 10a to 10d are installed in the building, namely, at the stage before the address setting, the management address information is written but the specific addresses of lighting apparatuses 10a to 10d are not written in management table 23a. The process of writing the specific addresses in management table 23a and establishing the correspondence between the management addresses and the specific addresses will be described later.

Infrared transmitter 25 is, for example, a transmitter such as an infrared light-emitting diode (LED) and transmits the management address information to lighting apparatuses 10a to 10d via infrared communication ic. This infrared communication ic is one-way communication from operation terminal 20 to lighting apparatuses 10a to 10d. Infrared communication ic is a communication system having a directivity. Thus, when information is transmitted to targeted lighting apparatus 10a, for example, necessary information can be conveyed only to targeted lighting apparatus 10a. Incidentally, in the present embodiment, infrared transmitter 25 incorporated in operation terminal 20 is used for communication. However, there is no particular limitation to this. Even if an infrared transmitter externally connected to operation terminal 20 is used for communication, it is substantially considered that infrared communication ic is conducted using operation terminal 20.

Display 22 is, for example, a liquid crystal monitor, and displays a layout in the building including lighting apparatuses 10a to 10d, information regarding the addresses of lighting apparatuses 10a to 10d, or operating states of lighting apparatuses 10a to 10d. When performing the address setting, as illustrated in FIG. 5, display 22 displays an entrance and a window of the building, and four icons 01, 02, 03, and 04. The locations of icons 01 to 04 in display 22 correspond to the locations of lighting apparatuses 10a to 10d installed in the actual building.

Operation key 21 is, for example, a touch panel that is used also as display 22. By operating this operation key 21, it is possible to write the management address information into controller 23 and start communicating with lighting apparatuses 10a to 10d and management device 30.

Icons 01 to 04 illustrated in FIG. 5 also serve as operation buttons. A user of operation terminal 20 touches icons 01 to 04, thereby performing a predetermined operation. In the present embodiment, the correspondence is established between icons 01 to 04 and the management address information stored in controller 23. Thus, the user touches a predetermined icon, thereby making it possible to read out predetermined management address information and transmit it externally. For example, icon 01 corresponds to the management address information regarding management address 01 (see FIG. 6). Thus, when the user of operation terminal 20 directs operation terminal 20 toward lighting apparatus 10a and touches icon 01, the management address information regarding management address 01 is transmitted only to lighting apparatus 10a via infrared communication ic.

Communicator 24 includes an antenna and a radio module. Communicator 24 can communicate with management device 30 using radio r3, and receives via radio r3 management address information and information regarding specific address that have been gathered in management device 30. In this manner, management device 30 and operation terminal 20 can share information regarding the address.

Lighting Apparatus

Each of lighting apparatuses 10a to 10d is, for example, an LED light, and installed in a building material such as a ceiling in a house or the like. In the present embodiment, as illustrated in (a) of FIG. 7, four lighting apparatuses 10a to 10d are aligned along a direction from the entrance to the window of building 50 (a Y direction). Incidentally, each of lighting apparatuses 10a to 10d is not limited to the LED light but may be a ceiling light.

Figure 3:
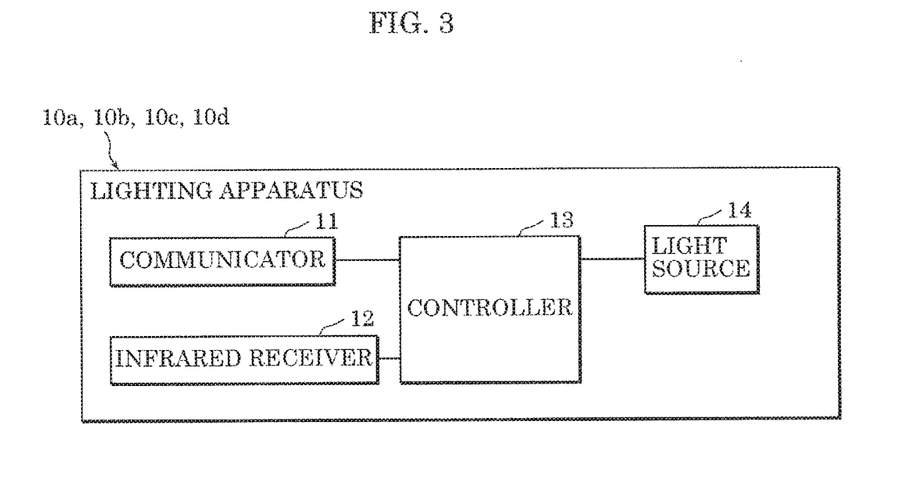
FIG. 3 is a block diagram illustrating a control configuration of the lighting apparatus.

FIG. 3 is a block diagram illustrating a control configuration of lighting apparatuses 10a to 10d.

Each of lighting apparatuses 10a to 10d includes light source 14, controller 13, infrared receiver 12, and communicator 11.

Light source 14 includes a plurality of light-emitting diodes that emit white light, red light, green light or blue light, for example. Controller 13 that receives a command from management device 30 controls dimming and/or toning of light source 14. It should be noted that, during the address setting, light source 14 is controlled so as to darken and lighten (blink) to allow surrounding people to know that the address is being set.

Controller 13 includes a CPU, a RAM, a ROM, and so on, and controls operating states of light source 14. Controller 13 reads out information and writes information for address setting.

Controller 13 stores its own specific address. The specific address is, for example, a media access control (MAC) address or a unique device identifier (UDID). At the stage immediately after lighting apparatuses 10a to 10d are installed in the building, namely, at the stage before the address setting, controller 13 has its specific address but has no management address information. Controller 13 stores the management address information for managing lighting apparatuses 10a to 10d when the management address information is transmitted from operation terminal 20 via infrared communication ic.

Infrared receiver 12 is, for example, an infrared sensor, and receives the management address information transmitted from operation terminal 20 via infrared communication ic. Using infrared communication ic makes it possible to obtain the management address information individually from operation terminal 20.

Communicator 11 includes an antenna and a radio module. Communicator 11 can communicate with management device 30, and transmits the management address information and the specific address stored in controller 13 to management device 30 via radio r2.

Moreover, communicator 11 can communicate with operation terminal 20 via radio r1. Lighting apparatuses 10a to 10d may transmit an acceptance signal to operation terminal 20 via this radio r1 so as to notify that lighting apparatuses 10a to 10d have received the management address information via infrared communication ic from operation terminal 20.

Management Device

Management device 30 is a management server for controlling operations of lighting apparatuses 10a to 10d. As illustrated in FIG. 1, management device 30 includes main body 30a and antenna 30b connected to main body 30a via a cable. Depending on the number of lighting apparatuses, a plurality of antennas 30b may be provided in building 50.

Figure 4:
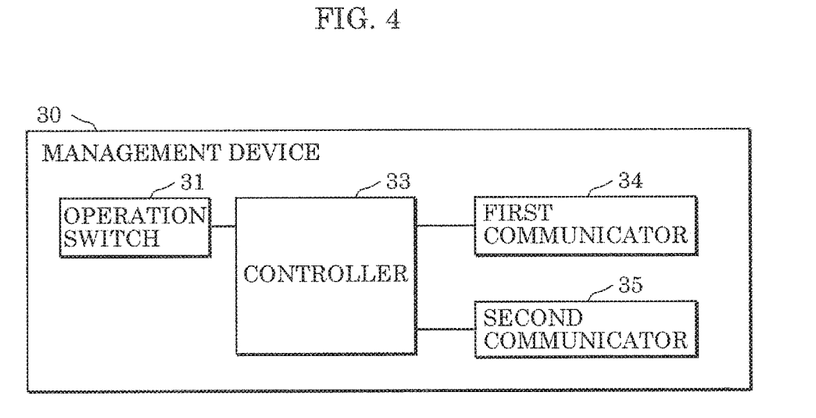
FIG. 4 is a block diagram illustrating a control configuration of the management device.

As illustrated in FIG. 4, management device 30 includes controller 33, first communicator 34, second communicator 35, and operation switch 31. Controller 33 is incorporated in main body 30a, and first communicator 34 and second communicator 35 are incorporated in antenna 30b. Operation switch 31 is disposed, for example, on a wall of building 50 that is external to main body 30a and accessible by a user.

Controller 33 includes a CPU, a RAM, a ROM, and so on, and controls the operations of lighting apparatuses 10a to 10d. Controller 33 reads out information and writes information for address setting.

At the stage immediately after lighting apparatuses 10a to 10d are installed in building 50, namely, at the stage before the address setting, controller 33 does not have the management address information or the specific address of each of lighting apparatuses 10a to 10d. Controller 33 stores such information when the address setting is started and the management address information and the specific address are transmitted from each of lighting apparatuses 10a to 10d. At that time, the management address information and the specific address are stored in correspondence with each other as illustrated in management table 33a of FIG. 9. In this manner, management device 30 can control the operations of lighting apparatuses 10a to 10d based on the management address information and the specific addresses.

First communicator 34 communicates with lighting apparatuses 10a to 10d by radio r2. Using this first communicator 34, the specific address and the management address are received from lighting apparatuses 10a to 10d.

Furthermore, second communicator 35 communicates with operation terminal 20 by radio r3. Using this second communicator 35, the specific address corresponding to the management address information is transmitted to operation terminal 20.

Operation switch 31 is a switch for operating lighting apparatuses 10a to 10d, and connected to controller 33 by wire or radio. The user operates operation switch 31, whereby controller 33 causes lighting apparatuses 10a to 10d to execute an operation corresponding to operation switch 31.

Address Setting

Now, a specific method for the address setting will be described.

Figure 7:
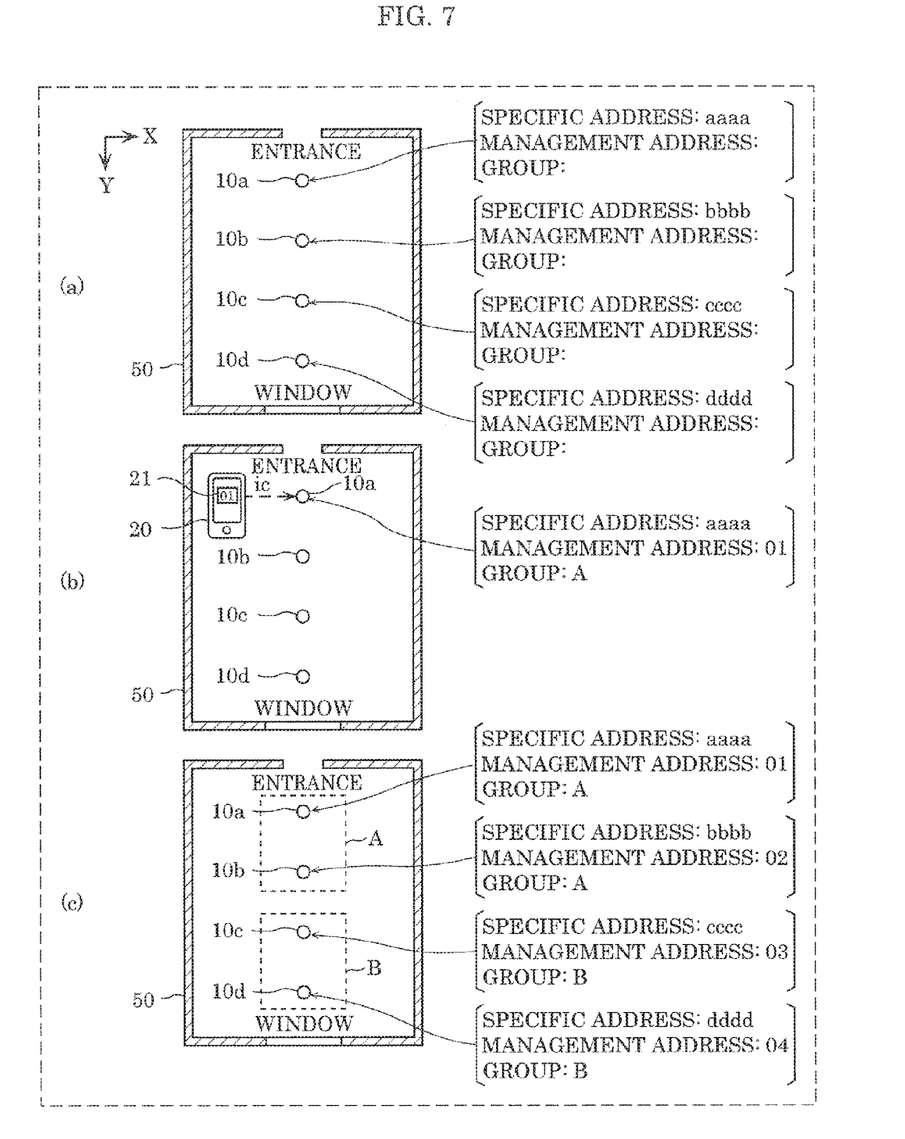
FIG. 7 illustrates locations of the lighting apparatuses in a building and address information to be written into each of the controllers of the lighting apparatuses.

FIG. 7 illustrates locations of lighting apparatuses 10a to 10d in a building and address information to be written in controller 13 of each of lighting apparatuses 10a to 10d.

As illustrated in (a) of FIG. 7, lighting apparatuses 10a to 10d are aligned along a direction from an entrance to a window of building 50. Each of lighting apparatuses 10a to 10d has its specific address. For example, lighting apparatus 10a has specific address "aaaa."

Here, (a) of FIG. 7 illustrates the stage before the address setting, where lighting apparatuses 10a to 10d do not yet store the management address information mentioned above. Thus, management device 30 does not grasp the location and group of each of lighting apparatuses 10a to 10d, and thus cannot control the operation of each of lighting apparatuses 10a to 10d at this stage. Accordingly, in order to establish the correspondence between the management address information and the specific address and grasp the location and group of each of lighting apparatuses 10a to 10d for the address management, the following address setting will be performed.

In advance, management device 30 transmits a predetermined signal to lighting apparatuses 10a to 10d that are to be subjected to the address setting so that lighting apparatuses 10a to 10d become ready for the address setting. Then, the address setting is started using operation terminal 20. Incidentally, as illustrated in FIG. 5, display 22 of operation terminal 20 displays the layout in building 50. Icons 01 to 04 in display 22 are arranged in correspondence with the locations of lighting apparatuses 10a to 10d in building 50.

Figure 8:
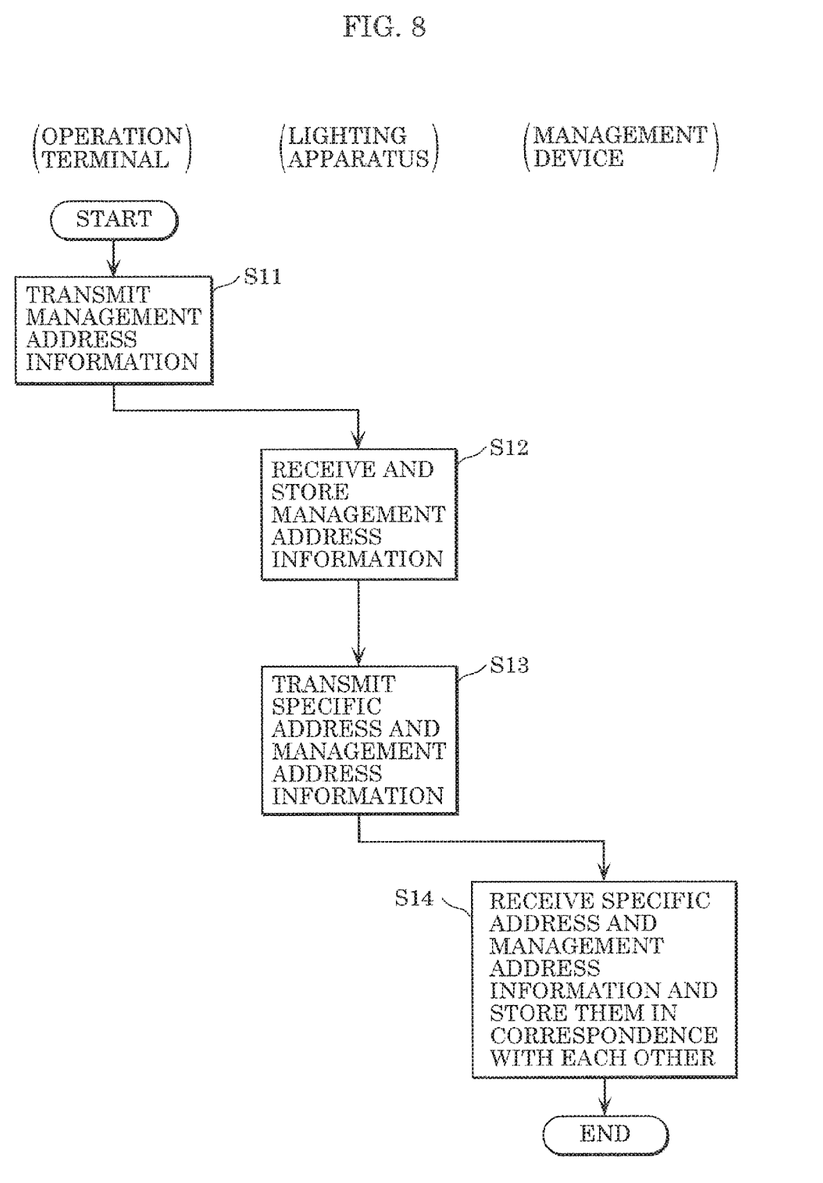
FIG. 8 is a flowchart for describing address setting in the operation terminal, the lighting apparatus, and the management device.

FIG. 8 is a flowchart for describing the address setting of operation terminal 20, lighting apparatuses 10a to 10d, and management device 30.

First, as illustrated in (b) of FIG. 7, operation terminal 20 is located near lighting apparatus 10a (near X=5 m, Y=5 m on the coordinates). Then, by touching icon 01 of operation terminal 20, the management address information regarding icon 01 is transmitted to lighting apparatus 10a via infrared communication ic (S11).

Lighting apparatus 10a receives the transmitted management address information. As illustrated in (b) of FIG. 7, controller 13 of lighting apparatus 10a stores information, namely, management address "01" and group "A" in correspondence with specific address "aaaa" (S12). In this manner, controller 13 recognizes that it has an own management address of "01" and an own group of "A." It should be noted that controller 13 also stores information regarding the location "X=5, Y=5" of its lighting apparatus 10a at the same time.

Lighting apparatus 10a that has received the management address information transmits the management address information and its own specific address to management device 30 using radio r2 (S13).

Management device 30 receives the transmitted management address information and the specific address of lighting apparatus 10a and stores them in controller 33 (S14). In this manner, in management device 30, the correspondence is established between the management address information regarding management address 01 and the specific address of lighting apparatus 10a.

Then, these Steps S11 to S14 are executed individually for lighting apparatuses 10b to 10d whose addresses have not been set. Through these processes, as illustrated in (c) of FIG. 7, the management address information is stored in each of lighting apparatuses 10a to 10d.

Figure 9:
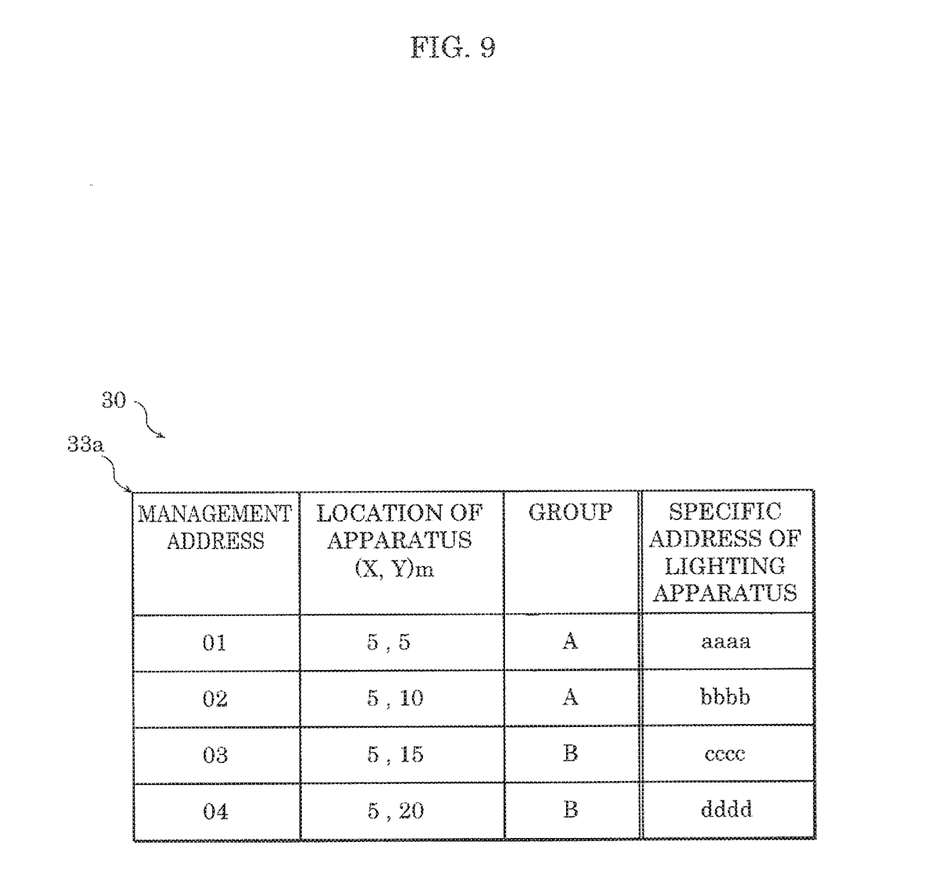
FIG. 9 illustrates an address management table stored in the controller of the management device.

Furthermore, in management device 30, the management address information regarding management addresses 01 to 04 and the specific addresses of lighting apparatuses 10a to 10d are brought into correspondence with one another and organized as management table 33a illustrated in FIG. 9. This allows management device 30 to control the operations of lighting apparatuses 10a to 10d based on the management address information and the specific addresses.

Figure 10:
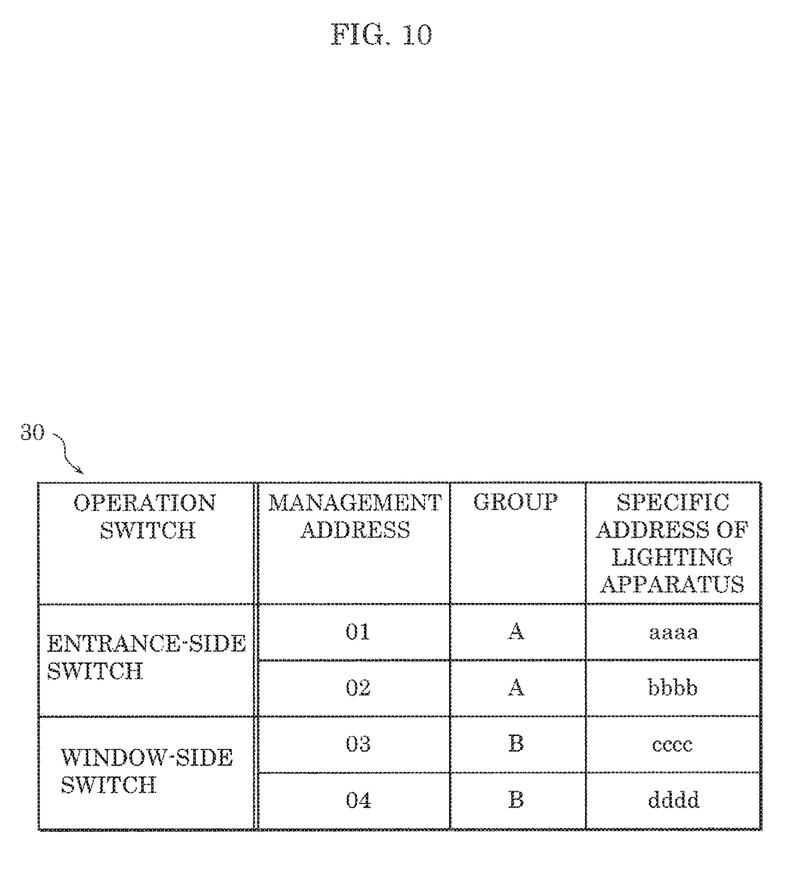
FIG. 10 illustrates a relationship between address information and an operation switch included in the controller of the management device.

For example, as illustrated in FIG. 10, an entrance-side switch of operation switch 31 is assigned to group A of management addresses 01 and 02, and a window-side switch thereof is assigned to group B of management addresses 03 and 04. In this way, lighting apparatuses 10a and 10b can be turned ON/OFF simultaneously by turning ON/OFF the entrance-side switch, whereas lighting apparatuses 10c and 10d can be turned ON/OFF simultaneously by turning ON/OFF the window-side switch.

As described above, in this management system, it is only necessary for the user holding operation terminal 20 to perform the address setting of each of lighting apparatuses 10a to 10d while moving near lighting apparatuses 10a to 10d sequentially, making it possible to provide lighting apparatuses 10a to 10d with the management address information and cause management device 30 to store the management address information and the specific addresses in an easy and reliable manner. Consequently, the management of lighting apparatuses 10a to 10d can be performed easily.

Next, the following is a description of how the management address information and the specific addresses are shared between management device 30 and operation terminal 20.

Figure 11:
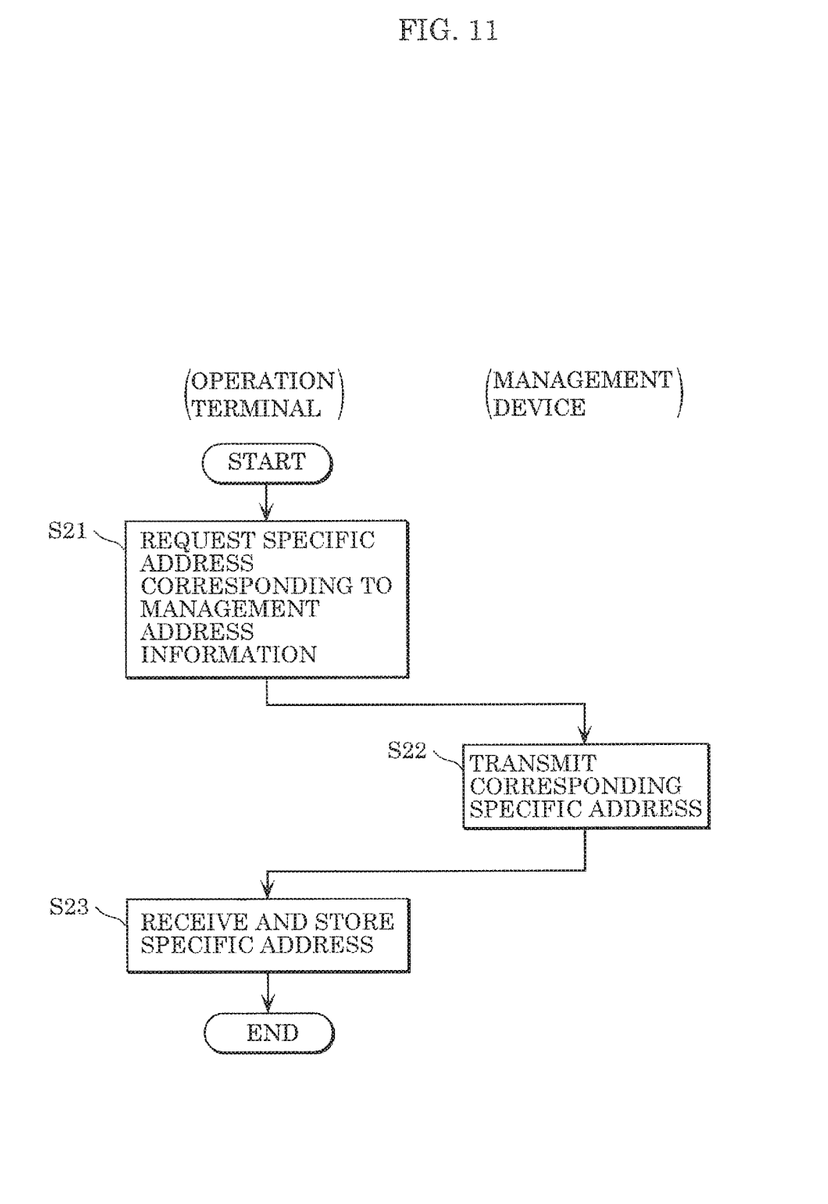
FIG. 11 is a flowchart for describing address setting in the operation terminal and the management device.

FIG. 11 is a flowchart for describing address setting in operation terminal 20 and management device 30.

First, operation terminal 20 is moved into a range where radio r3 can reach management device 30. Then, operation terminal 20 requests management device 30 to transmit the specific address corresponding to the management address information grasped by operation terminal 20 (S21).

Management device 30 that has received the request for the specific address reads out the corresponding specific address from controller 33 and transmits it to operation terminal 20 (S22).

Operation terminal 20 receives the transmitted specific address and stores it in controller 23 (S23). Through these processes, a management table similar to FIG. 9 is stored also in operation terminal 20.

Furthermore, display 22 in operation terminal 20 displays icons 01 to 04 and the management address information regarding management addresses 01 to 04 that are in correspondence with one another. In this manner, in display 22, the management addresses, locations, groups, and specific addresses of lighting apparatuses 10a to 10d can be visualized (mapped) in an organized state. As a result, it becomes possible to check the operating states of lighting apparatuses 10a to 10d with display 22 of operation terminal 20 and operate lighting apparatuses 10a to 10d with operation key 21 of operation terminal 20.

Incidentally, the above-described management system managing the plurality of lighting apparatuses can be utilized not only for lighting apparatuses but also for electrical apparatuses such as a display apparatus and an audio apparatuses.

ADVANTAGEOUS EFFECTS, ETC.

Electrical apparatus management system 100 according to the present embodiment includes a plurality of electrical apparatuses 10 installed in building 50, management device 30 that communicates with each of the plurality of electrical apparatuses 10, and an operation terminal that communicates with each of the plurality of electrical apparatuses 10. Operation terminal 20 transmits management address information individually to each of the plurality of electrical apparatuses 10 using radio having a directivity, the management address information being information to be assigned individually to each of the plurality of electrical apparatuses 10. Each of the plurality of electrical apparatuses 10 has an own specific address, stores the management address information that has been transmitted from operation terminal 20, and transmits the specific address and the management address information. Management device 30 establishes a correspondence between the specific address and the management address information that have been transmitted, stores the specific address and the management address information, and controls operations of the plurality of electrical apparatuses 10 based on the specific address and the management address information that have been stored.

By transmitting the management address information to electrical apparatuses 10 using the radio having the directivity as described above, operation terminal 20 can be used to perform the address setting in each of electrical apparatuses 10. This makes it easier to perform the address setting, so that the plurality of electrical apparatuses 10 can be managed easily.

Furthermore, each of the plurality of electrical apparatuses 10 may transmit the specific address and the management address information to management device 30, and operation terminal 20 may obtain the specific address corresponding to the management address information by communicating with management device 30.

In this way, the management address information and the specific address of each of electrical apparatuses 10 can be shared between operation terminal 20 and management device 30. By sharing such information, for example, the management address information and the specific address of each of electrical apparatuses 10 can be organized and visualized in display 22. As a result, operation terminal 20 can check and manage the operating states of electrical apparatuses 10 easily.

Moreover, the management address information may include information regarding a management address for identifying the plurality of electrical apparatuses 10, a location of each of the plurality of electrical apparatuses 10 in building 50, and a group to which each of the plurality of electrical apparatuses 10 belongs.

This allows management device 30 to grasp the locations and groups of the plurality of electrical apparatuses 10, so that the operation of each of electrical apparatuses 10 can be controlled according to its location or group.

Additionally, operation terminal 20 may transmit the management address information using an infrared ray, and each of the plurality of electrical apparatuses 10 may receive the management address information transmitted using the infrared ray.

The above-described use of the infrared ray allows operation terminal 20 to transmit the address information individually to targeted electrical apparatus 10. In this manner, necessary information can be transmitted individually unlike a radio communication system such as broadcasting.

Also, the radio having the directivity may be an infrared ray, and each of the plurality of electrical apparatuses 10 may include infrared receiver 12 that receives the management address information transmitted using the infrared ray.

With this, since each of electrical apparatuses 10 includes infrared receiver 12, it is possible to individually receive the address information using the infrared ray.

Moreover, at least a part of the plurality of electrical apparatuses 10 may be lighting apparatuses 10a to 10d.

Consequently, the management of lighting apparatuses 10a to 10d can be performed easily. Furthermore, when a lighting apparatus, a display apparatus, and an audio apparatus are used in collaboration with one another, the overall management and operation control of these lighting, display, and audio apparatuses become possible.

Embodiment 2

Electrical apparatus management system 100 according to Embodiment 2 has an address setting route partially different from that in Embodiment 1. More specifically, instead of conveying the management address information and the specific addresses from lighting apparatuses 10a to 10d to management device 30, the management address information and the specific addresses are conveyed from operation terminal 20 to management device 30.

Figure 12:
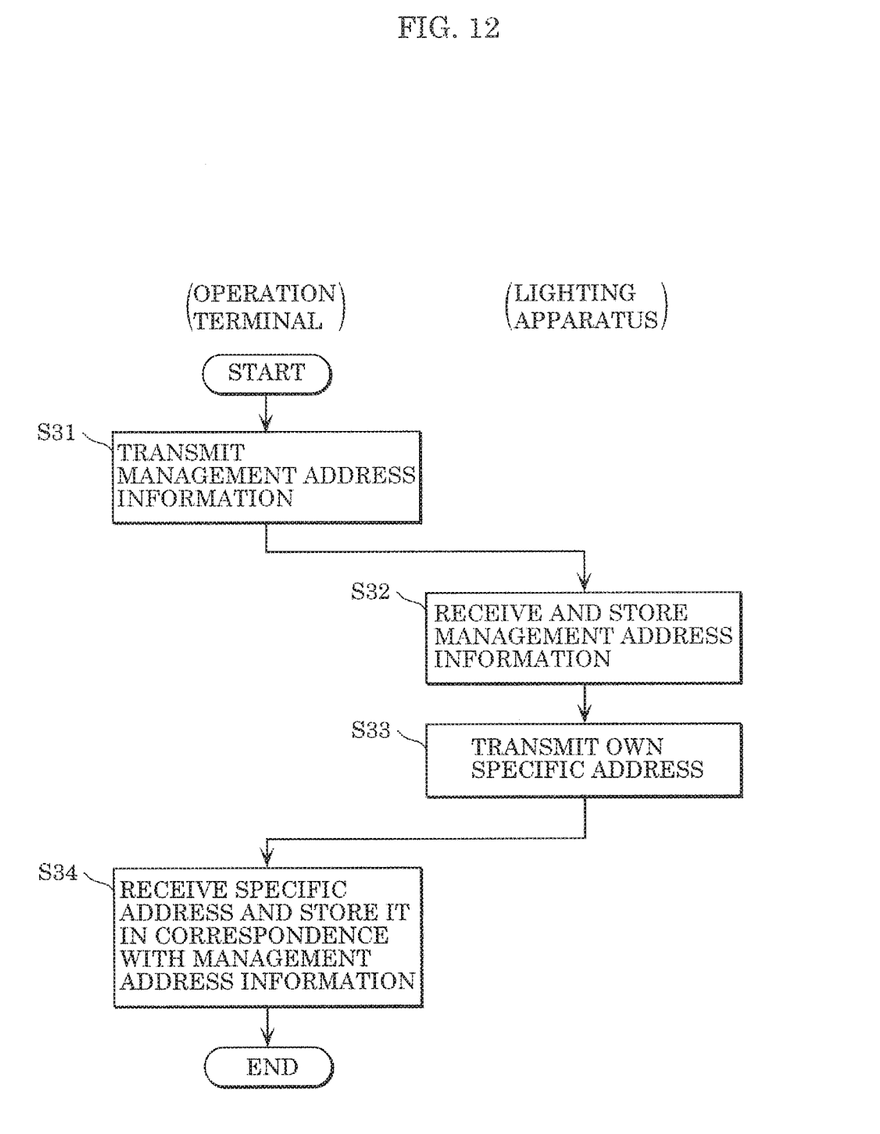
FIG. 12 is a flowchart for describing address setting in an operation terminal and a lighting apparatus of an electrical apparatus management system according to Embodiment 2.

FIG. 12 is a flowchart for describing address setting in operation terminal 20 and lighting apparatuses 10a to 10d.

First, operation terminal 20 is moved close to lighting apparatus 10a, and the management address information is transmitted individually from operation terminal 20 to lighting apparatus 10a using infrared communication ic (S31).

Lighting apparatus 10a receives the transmitted management address information. Controller 13 in lighting apparatus 10a stores the management address information corresponding to the specific address (S32).

Lighting apparatus 10 that has received the management address information transmits its own specific address and the management address information to operation terminal 20 using radio r1 (S33).

Operation terminal 20 receives the transmitted specific address and stores it in controller 23 (S34). In this manner, in operation terminal 20, the correspondence is established between the management address information regarding management address 01 and the specific address of lighting apparatus 10a.

Then, these Steps S31 to S34 are executed individually for lighting apparatuses 10b to 10d whose addresses have not been set.

Through these processes, the management address information is stored in each of lighting apparatuses 10a to 10d. Furthermore, in operation terminal 20, the management address information is brought into correspondence with the specific addresses of lighting apparatuses 10a to 10d and written into management table 23a. A user holding operation terminal 20 only has to perform the address setting of each of lighting apparatuses 10a to 10d while sequentially moving near lighting apparatuses 10a to 10d. Thus, it is possible to assign the management address information to lighting apparatuses 10a to 10d in an easy and reliable manner.

Furthermore, display 22 in operation terminal 20 displays icons 01 to 04 and the management address information regarding management addresses 01 to 04 that are in correspondence with one another. In this manner, in display 22, the management addresses, locations, groups, and specific addresses of lighting apparatuses 10a to 10d can be visualized in an organized state.

Next, the following is a description of how the management address information and the specific address are shared between management device 30 and operation terminal 20.

Figure 13:
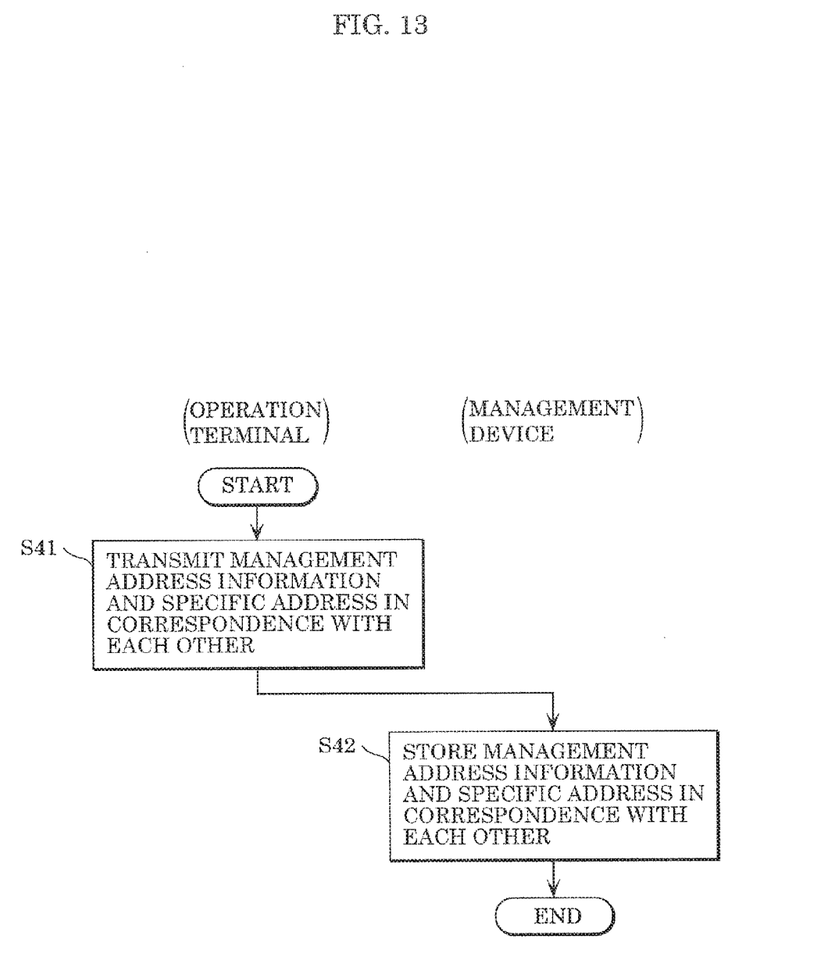
FIG. 13 is a flowchart for describing address setting in the operation terminal and a management device of the electrical apparatus management system according to Embodiment 2.

FIG. 13 is a flowchart for describing address setting in operation terminal 20 and management device 30.

First, operation terminal 20 is moved into a range where radio r3 can reach management device 30. Then, operation terminal 20 transmits to management device 30 all of the specific addresses and the management address information that are in correspondence with one another (S41).

Management device 30 receives the specific addresses and the management address information that have been transmitted, and stores them in controller 33 (S42). In this way, management device 30 stores management table 33a similar to FIG. 9. Management device 30 can control the operations of lighting apparatuses 10a to 10d based on specific addresses and the management address information that have been stored.

Incidentally, the above-described management system that manages the plurality of lighting apparatuses can be utilized not only for lighting apparatuses but also for electrical apparatuses such as a display apparatus and an audio apparatuses.

In accordance with electrical apparatus management system 100 in the present embodiment, each of the plurality of electrical apparatuses 10 transmits the specific address and the management address information to operation terminal 20. Operation terminal 20 stores the specific addresses transmitted from the plurality of electrical apparatuses 10 in correspondence with the management address information, and transmits to management device 30 the specific addresses and the management address information that have been stored.

In this way, the management address information and the specific address of each of electrical apparatuses 10 can be shared by operation terminal 20 and management device 30. Sharing such information allows the early checking of the management address information and the specific addresses of electrical apparatuses 10 for each electrical apparatus, for example, on display 22.

Others

Although electrical apparatus management system 100 has been described above based on embodiments, the present disclosure is not limited to the above embodiments. For example, a mode obtained by making various modifications conceivable by a person skilled in the art to the above embodiments and a mode configured by any combination of the structural components and functions in the embodiments as long as not departing from the purport of the present disclosure fall within the scope of the present disclosure.

For example, at the time of address setting, management device 30 may transmit an pairing address for pairing operation terminal 20 and lighting apparatuses 10a to 10d to each of lighting apparatuses 10a to 10d, so that operation terminal 20 and lighting apparatuses 10a to 10d may perform the pairing at the same time with the address setting.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An electrical apparatus management system comprising:
   a plurality of electrical apparatuses;
   a management device that communicates with each of the plurality of electrical apparatuses; and
   an operation terminal that communicates with each of the plurality of electrical apparatuses, wherein:
   the operation terminal transmits management information individually to each of the plurality of electrical apparatuses using radio having directivity, the management information being information to be used to identify each of the plurality of electrical apparatuses,
   each of the plurality of electrical apparatuses has an own specific address, receives the management information that has been transmitted from the operation terminal, and transmits the specific address and the management information, and
   the management device establishes a correspondence between the specific address and the management information that have been transmitted for the plurality of electrical apparatuses, respectively, stores the specific address and the management information, and controls operations of the plurality of electrical apparatuses based on at least one of the specific address and the management information that have been stored.

2. The electrical apparatus management system according to claim 1, wherein each of the plurality of electrical apparatuses stores the received management information.

3. The electrical apparatus management system according to claim 1,
   wherein each of the plurality of electrical apparatuses transmits the specific address and the received management information to the management device, and
   the operation terminal obtains the specific address corresponding to the management information by communicating with the management device.

4. The electrical apparatus management system according to claim 1,
wherein each of the plurality of electrical apparatuses transmits the specific address and the received management information to the operation terminal, and
the operation terminal stores the specific address transmitted from each of the plurality of electrical apparatuses in correspondence with the management information, and transmits to the management device the specific address and the management information corresponding to the specific address.

5. The electrical apparatus management system according to claim 1,
wherein the management information includes a management address for identifying the plurality of electrical apparatuses, location information for specifying a location of each of the plurality of electrical apparatuses in a building where the plurality of electrical apparatuses are installed, and a group to which each of the plurality of electrical apparatuses belongs.

6. The electrical apparatus management system according to claim 1,
wherein the management information includes a management address for identifying the plurality of electrical apparatuses and location information for specifying a location of each of the plurality of electrical apparatuses in a building where the plurality of electrical apparatuses are installed.

7. The electrical apparatus management system according to claim 6, wherein the management device establishes a correspondence between the specific address and at least one of the management address and the location information for the plurality of electrical apparatuses, respectively and controls operations of the plurality of electrical apparatuses based on at least one of the specific address, the management address and the location information.

8. The electrical apparatus management system according to claim 1,
wherein the operation terminal transmits the management information using an infrared ray, which is the radio having the directivity, and
each of the plurality of electrical apparatuses receives the management information transmitted using the infrared ray.

9. The electrical apparatus management system according to claim 1,
wherein the radio having the directivity is an infrared ray, and
each of the plurality of electrical apparatuses includes an infrared receiver that receives the management information transmitted using the infrared ray.

10. The electrical apparatus management system according to claim 1,
wherein at least a part of the plurality of electrical apparatuses is a lighting apparatus.

11. The electrical apparatus management system according to claim 1, wherein the operation terminal displays the management information in correspondence with the specific address for the plurality of electrical apparatuses, respectively.

* * * * *